(12) United States Patent
Tachikawa et al.

(10) Patent No.: US 10,576,564 B2
(45) Date of Patent: Mar. 3, 2020

(54) COMBINED GEAR CUTTING APPARATUS

(71) Applicant: AISIN SEIKI KABUSHIKI KAISHA, Kariya-shi, Aichi-ken (JP)

(72) Inventors: Tomokazu Tachikawa, Obu (JP); Nobuaki Kurita, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 102 days.

(21) Appl. No.: 15/891,821

(22) Filed: Feb. 8, 2018

(65) Prior Publication Data

US 2018/0236576 A1 Aug. 23, 2018

(30) Foreign Application Priority Data

Feb. 20, 2017 (JP) ................... 2017-028711

(51) Int. Cl.
 *B23F 17/00* (2006.01)
 *B23F 19/10* (2006.01)
 (Continued)

(52) U.S. Cl.
 CPC ............ *B23F 17/006* (2013.01); *B23B 41/00* (2013.01); *B23F 1/065* (2013.01); *B23F 5/163* (2013.01);
 (Continued)

(58) Field of Classification Search
 CPC ..... Y10T 409/100159; Y10T 409/00–109699; Y10T 29/50–52; G05B 2219/36198;
 (Continued)

(56) References Cited

U.S. PATENT DOCUMENTS 3,267,344 A * 8/1966 McDaniel .......... G05B 19/0405
  318/39
4,585,377 A * 4/1986 Nozawa ................ B23F 23/006
  409/15

(Continued)

FOREIGN PATENT DOCUMENTS

JP 3-228519 10/1991

*Primary Examiner* — Erica E Cadugan
(74) *Attorney, Agent, or Firm* — Finnegan, Henderson, Farabow, Garrett & Dunner, LLP

(57) ABSTRACT

A combined gear cutting apparatus includes a workpiece drive portion, a first processing portion holding and moving a first tool to a processing position for a workpiece, a second processing portion holding and moving a second tool to a processing position for the workpiece, and a control portion which includes a storage portion storing workpiece information indicating a configuration of the workpiece before first processing is performed, first tool information, second tool information and relative position information. The control portion includes a tooth groove configuration calculation portion calculating tooth groove configuration information of the workpiece based on the first tool information, the workpiece information and the relative position information obtained when the first processing is completed. The second tool is configured to move to a start position of second processing for the workpiece based on the tooth groove configuration information, the second tool information and the relative position information.

4 Claims, 5 Drawing Sheets

(51) Int. Cl.
*B23F 1/06* (2006.01)
*B23Q 39/02* (2006.01)
*B23B 41/00* (2006.01)
*G05B 19/19* (2006.01)
*G05B 19/402* (2006.01)
*B23F 19/00* (2006.01)
*B23F 23/12* (2006.01)
*B23F 5/16* (2006.01)
*G05B 19/18* (2006.01)

(52) U.S. Cl.
CPC .............. *B23F 19/00* (2013.01); *B23F 19/10* (2013.01); *B23F 23/1218* (2013.01); *B23Q 39/027* (2013.01); *G05B 19/186* (2013.01); *G05B 19/19* (2013.01); *G05B 19/402* (2013.01); *G05B 2219/45214* (2013.01); *Y10T 29/5107* (2015.01); *Y10T 29/5176* (2015.01); *Y10T 408/08* (2015.01); *Y10T 409/100159* (2015.01); *Y10T 409/101113* (2015.01); *Y10T 409/105565* (2015.01); *Y10T 409/108586* (2015.01)

(58) Field of Classification Search
CPC ........ G05B 2219/45214; G05B 19/186; G05B 19/19–19/402

USPC ................... 409/1–62; 29/560–650; 700/192
See application file for complete search history.

(56) References Cited

U.S. PATENT DOCUMENTS

| | | | | |
|---|---|---|---|---|
| 5,037,252 | A * | 8/1991 | Hasegawa | B23F 23/006 318/625 |
| 5,051,913 | A * | 9/1991 | Kume | B23F 23/006 700/186 |
| 5,127,140 | A * | 7/1992 | Oiwa | B23B 3/167 29/27 C |
| 5,260,879 | A * | 11/1993 | Sasaki | B23F 23/006 409/2 |
| 6,079,090 | A * | 6/2000 | Ongaro | B23F 17/006 29/27 C |
| 6,618,917 | B2 * | 9/2003 | Sugiura | B23B 3/162 29/27 C |
| 8,151,437 | B2 * | 4/2012 | Muller | B23F 17/008 29/38 R |
| 2008/0213055 | A1 * | 9/2008 | Ozdyk | B23F 21/166 29/56.5 |
| 2013/0047390 | A1 * | 2/2013 | Ongaro | B23Q 39/026 29/27 C |

* cited by examiner

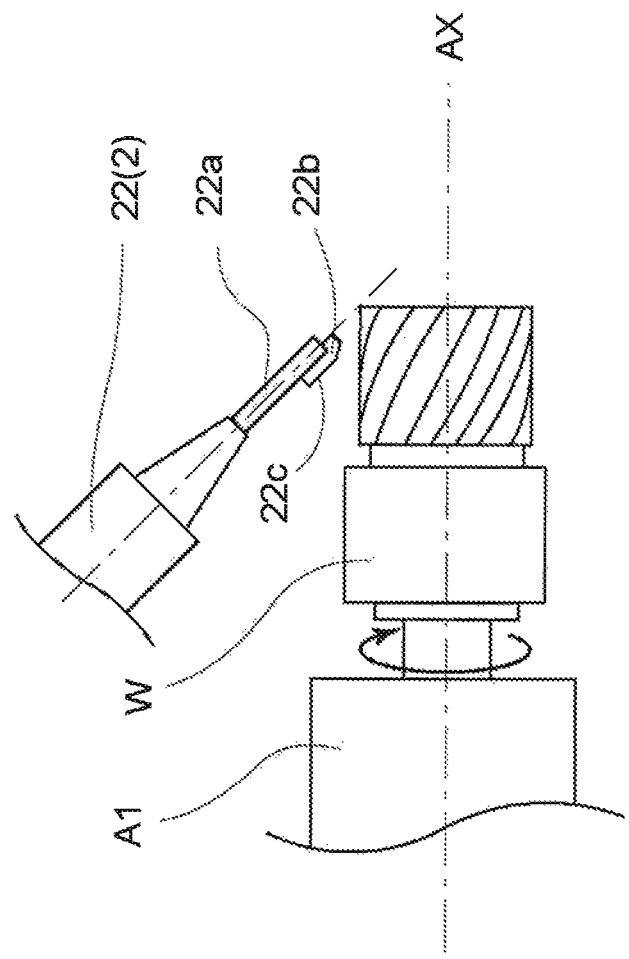

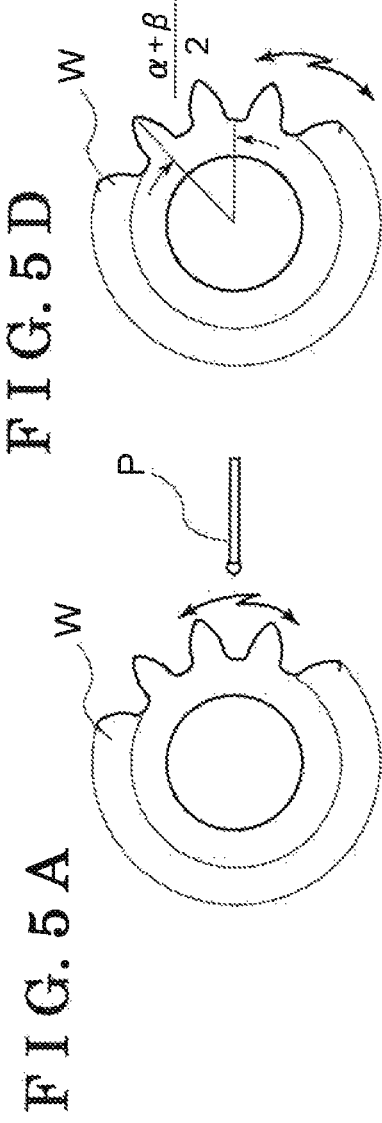
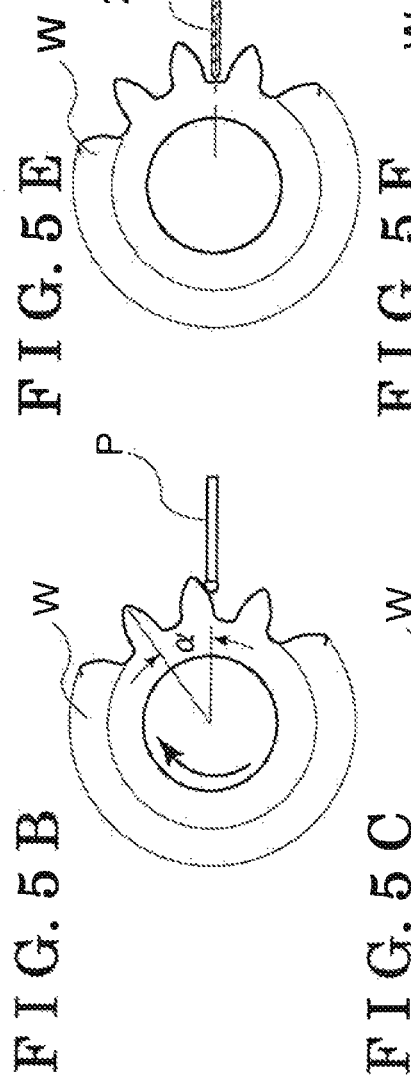
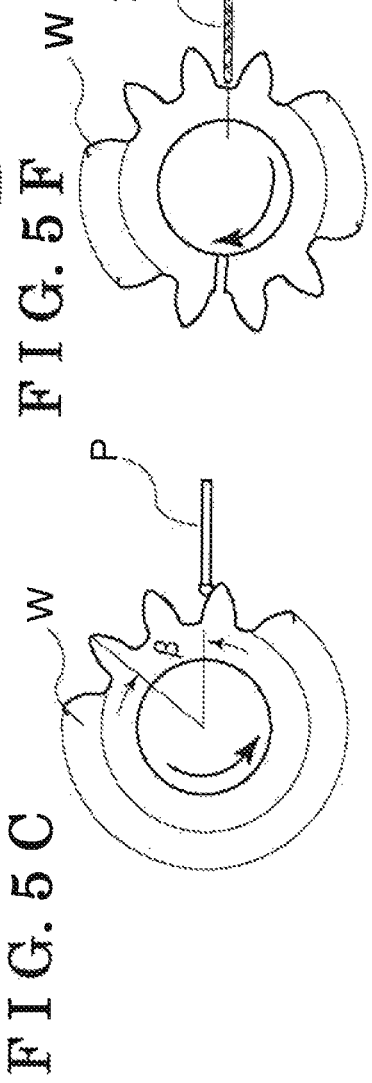

COMBINED GEAR CUTTING APPARATUS

CROSS REFERENCE TO RELATED APPLICATIONS

This application is based on and claims priority under 35 U.S.C. § 119 to Japanese Patent Application 2017-028711, filed on Feb. 20, 2017, the entire content of which is incorporated herein by reference.

TECHNICAL FIELD

This disclosure generally relates to a combined gear cutting apparatus.

BACKGROUND DISCUSSION

As a combined gear cutting apparatus which performs first processing on a workpiece serving as a processing object and thereafter performs second or later processing on the workpiece with a tool other than a tool used for the first processing, a gear cutter performing a gear cutting process and a finishing process, for example, on the workpiece is known. In the aforementioned gear cutter, the workpiece is positioned by a positioning jig so that the gear cutting process is first performed with a cutter on the workpiece. After the gear cutting process, the cutter is replaced with the other tool to perform the finishing process or chamfering process. At this time, positioning a tooth surface of the workpiece relative to the gear cutter is necessary. For example, a touch sensor is employed for specifying or identifying the position of the tooth surface.

The touch sensor is supported at the positioning jig or a different mechanism provided at equipment for the gear cutter. A position of the touch sensor relative to the workpiece is determined by a position adjustment means. A position (or direction) of the workpiece is also determined by an operation of the positioning jig. The position adjustment of the touch sensor and change of the position of the workpiece may be performed manually in many cases. Thus, the aforementioned adjustment and change may be complicated in a case where a space for supporting the workpiece is small, which may decrease working efficiency in the chamfering process or the finishing process performed after the gear cutting process, for example.

In order to eliminate the aforementioned drawbacks, according to JPH3-228519A, a proximity switch is employed in addition to the touch sensor. Specifically, the proximity switch is provided together with the touch sensor at the positioning jig. A positional relationship between the proximity switch and the touch sensor is specified beforehand so that the touch sensor is positioned above a tooth groove formed at the workpiece in a case where the proximity switch detects a tooth tip or the tooth groove formed at the workpiece. The proximity switch is brought to come closer to the workpiece with some distance and then a gear wheel of the workpiece is rotated until the proximity switch detects the tooth tip or the tooth groove. When the proximity switch detects the tooth tip or the tooth groove, the touch sensor is inserted to the tooth groove to detect a tooth surface.

With the aforementioned construction, the touch sensor is positioned above the tooth groove in a case where the proximity switch detects the tooth tip or the tooth groove. A visual confirmation is not necessary for the position adjustment of the tooth groove relative to the touch sensor. Therefore, an operation for positioning the tooth surface may be streamlined and the aforementioned positioning operation may be automatically performed.

Nevertheless, according to the aforementioned technique disclosed in JPH3-228519A, in a case where a foreign substance such as a chip, for example, is adhered to the proximity switch (magnetic sensor), the position of the tooth surface is not accurately measured. In addition, during a cutting process of the workpiece, the magnetic sensor or the proximity switch should be positioned away from the workpiece. A large apparatus configuration or installation space is required, which may increase processing cost.

Further, the workpiece may be rotated plural times when being sensed. Thus, it may be necessary to perform statistical processing on measurement (i.e., sensing) information, for example, to identify position information of the workplace, which may elongate sensing time of the workpiece.

A need thus exists for a combined gear cutting apparatus which is not susceptible to the drawback mentioned above.

SUMMARY

According to an aspect of this disclosure, a combined gear cutting apparatus includes a workpiece drive portion configured to hold and rotate a workpiece which serves as a processing object, a first processing portion holding a first tool which serves as a gear cutting tool and moving the first tool to a processing position for the workpiece in a state where the first tool rotates synchronously with the workpiece drive portion, a second processing portion holding a second tool which serves as a cutting tool different from the gear cutting tool and moving the second tool to a processing position for the workpiece in a state where the second tool is synchronized with the workpiece drive portion, and a control portion controlling driving operations of the workpiece drive portion, the first processing portion and the second processing portion. The control portion includes a storage portion which stores workpiece information indicating a configuration of the workpiece relative to a workpiece reference point of the workpiece drive portion before first processing is performed, first tool information specifying a position of a cutting blade of the first tool relative to a first reference point of the first processing portion, second tool information specifying a position of a cutting blade of the second tool relative to a second reference point of the second processing portion, and relative position information specifying a relative position between the workpiece reference point, the first reference point and the second reference point. The control portion includes a tooth groove configuration calculation portion calculating tooth groove configuration information of the workpiece relative to the workpiece reference point based on the first tool information, the workpiece information and the relative position information obtained when the first processing by the first tool is completed. The second tool is configured to move to a start position of second processing for the workpiece based on the tooth groove configuration information, the second tool information and the relative position information.

BRIEF DESCRIPTION OF THE DRAWINGS

The foregoing and additional features and characteristics of this disclosure will become more apparent from the following detailed description considered with the reference to the accompanying drawings, wherein:

FIG. 4 is an explanatory view illustrating a tooth chamfering process according to a second embodiment disclosed here; and FIGS. 5A, 5B, 5C, 5D, 5E and 5F are explanatory views each illustrating a method for determining a position of a workpiece according to a third embodiment disclosed here.

DETAILED DESCRIPTION

A combined gear cutting apparatus S according to a first embodiment is explained with reference to FIGS. 1 and 2. The combined gear cutting apparatus S is configured to successively perform first processing (a gear cutting process) and second processing (a cutting process) in a state of keeping holding a workpiece W at a workpiece drive portion A.

Figure 1:
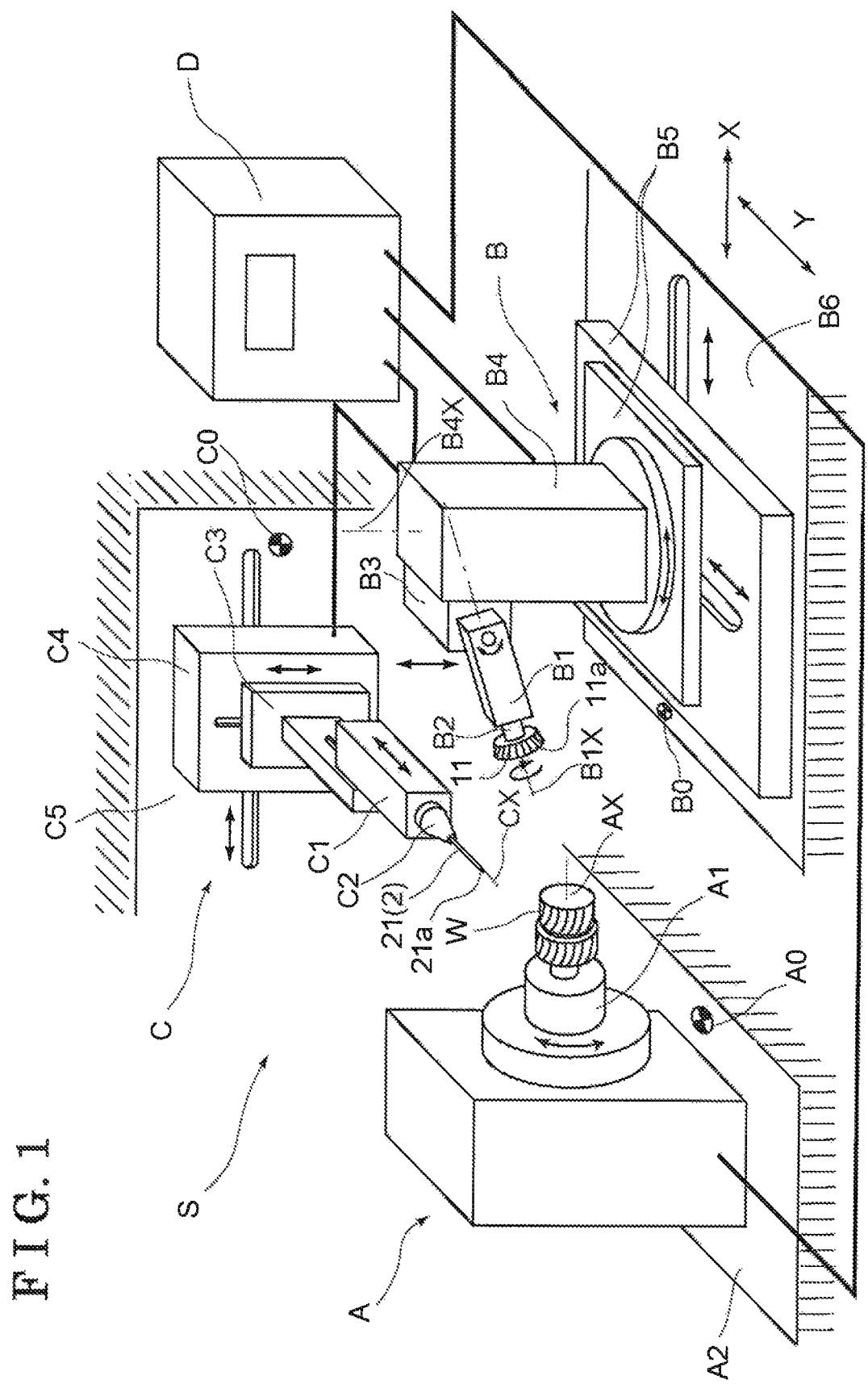
FIG. 1 is a perspective view illustrating a construction of a combined gear cutting apparatus according to a first embodiment disclosed here.

As illustrated in FIG. 1, the combined gear cutting apparatus S mainly includes the workpiece drive portion A rotating the workpiece W which serves as a processing object while keeping holding the workpiece W, a first processing portion B performing the first processing such as gear cutting, for example, on the workpiece W, and a second processing portion C performing the second processing such as boring, for example, on the workpiece W successively after the first processing. The combined gear cutting apparatus S further includes a control portion D controlling the workpiece drive portion A, the first processing portion B and the second processing portion C to operate together and to be driven.

As illustrated in FIG. 1, the workpiece drive portion A holds the workpiece W to rotate and drives the workpiece W at a predetermined rotation speed. The workpiece W in a cylindrical form is held at a main shaft A1. In the present embodiment, the workpiece W includes two gear portions (gear wheels). Alternatively, the workpiece W may include a single gear portion. In addition, various types of forms are applicable to the main shaft A1. For example, a chuck including a jaw which is inserted to a tubular inner diameter portion of the workpiece W, the tubular inner diameter portion being provided at a center portion of the workpiece W, so as to expand to a radially outer side may be employed. In addition, shrinkage fitting where a member including a receiving portion to which a holding portion in a bar form provided at an end portion of the workpiece W is inserted so as to hold the workpiece W by thermal fitting may be employed.

Figure 2:
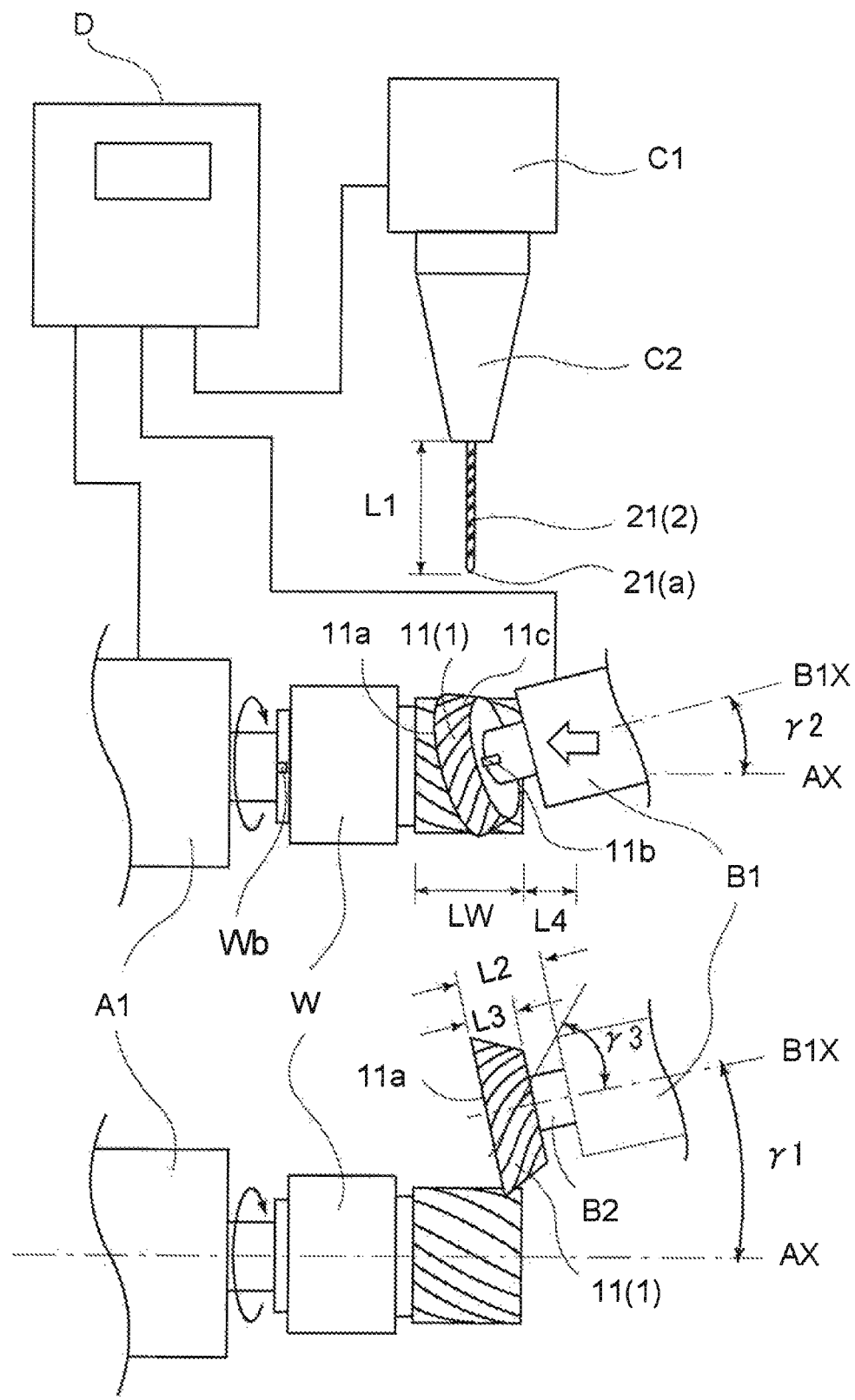
FIG. 2 is an explanatory view illustrating details of a processing portion processed by the combined gear cutting apparatus according to the first embodiment.

In order to achieve and maintain a relative positional relationship between the main shaft A1 and the workpiece W when the workpiece W is mounted at the main shaft A1, an engagement portion Wb including a protruding portion and a recess portion which engage with each other may be provided over the workpiece W and the main shaft A1 as illustrated in FIG. 2. Specifically, one of the protruding portion and the recess portion is provided at one of the workpiece W and the main shaft A1 while the other of the protruding portion and the recess portion is provided at the other of the workpiece W and the main shaft A1. In this case, when the aforementioned shrinkage fitting is firm enough so that displacement of the position of the workpiece W relative to the main shaft A1 hardly occurs during the processing of the workpiece W, the engagement portion Wb is not necessary. In FIG. 2, an upper diagram illustrates the combined gear cutting apparatus S as viewed from an upper side and a lower diagram illustrates the combined gear cutting apparatus S as viewed from a lateral side.

An electric motor (motor) provided at the workpiece drive portion A may selectively specify its rotation speed within a predetermined range and may also recognize its rotation angle. An apparatus for measuring a rotation position of the motor such as an encoder, for example, may be thus provided at a drive shaft of the workpiece drive portion A.

A workpiece reference point A0 is provided at a specific portion in a base portion A2, for example, of the workpiece drive portion A. A configuration of the workpiece W held at the main shaft A1 is recognized on a basis of the workpiece reference point A0. That is, a position and a direction of each surface of the workpiece W relative to the workpiece reference point A0 are constantly monitored. Such monitoring is performed by the control portion D.

The first processing portion B includes a first tool 1 for performing the first processing on the workpiece W. In the embodiment, the first tool 1 corresponds to a gear cutting tool for producing a gear wheel. For example, a cutter 11 for skiving is employed as the first tool 1.

The cutter 11 is held at a processing head B1 as illustrated in FIGS. 1 and 2. The cutter 11 is formed in a circular cone or a cylinder form. The cutter 11 includes an edge portion at a tip end side including a large diameter, the edge portion serving as a cutting blade 11a. As illustrated in FIG. 2, the cutter 11 is fixed to the processing head B1 with an engagement portion 11b, for example, so as not to be displaced relative to the processing head B1. Accordingly, a relative rotation phase of the cutting blade 11a relative to a main shaft B2 of the processing head B1 becomes known, so that the position of the cutting blade 11a may be constantly recognized and grasped.

The cutter 11 is fed along a rotation axis AX of the workpiece W while maintaining a predetermined tilt angle γ1 and a predetermined axial tolerance angle γ2 relative to the rotation axis AX as illustrated in FIG. 2.

The first processing portion B includes a drive portion which configures to perform six operations. Specifically, the first processing portion B includes the processing head B1 which rotates the cutter 11 held at the processing head B1 and which rotatably moves in an up-down direction so as to determine the tilt angle γ1 of the cutter 11, a lifting portion B3 moving in the up-down direction while supporting the processing head B1 which is rotatable, a rotation portion B4 being rotatable around a vertical axis B4X while supporting the lifting portion B3, and an X-Y moving portion B5 configured to move (specifically, translate) the rotation portion B4 in an X direction along the rotation axis AX of the workpiece W and in a Y direction orthogonal to the rotation axis AX.

A first reference point B0 serving as a reference position of the first processing portion B is provided at a specific portion in a base portion B6 of the first processing portion B, the base portion B6 receiving the X-Y moving portion B5. Thus, the position of the cutting blade 11a of the cutter 11 relative to the first reference point B0 is recognized. Each of the processing head B1, the lifting portion B3, the rotation portion B4 and the X-Y moving portion B5 includes a counter such as an encoder, for example, so as to accurately recognize a rotation angle upon rotary movement or a moving distance upon translational motion of the cutter 11 (the cutting blade 11a). A measurement value at each of the counters is transmitted to the control portion D.

The second processing portion C includes a second tool 2 serving as a cutting tool different from the first tool 1 so as to successively process the workpiece W after the first processing, without removing the workpiece W from the workpiece drive portion A. The second tool 2 is a drill 21, for example, as illustrated in FIG. 1.

In the present embodiment, the drill 21 is held at a chuck C2 of a processing head C1 so that a rotation axis CX of the drill 21 is horizontal. The processing head C1 is supported at a lifting portion C3 in a state being movable in a reciprocating manner in the Y direction. The lifting portion C3 is supported at an X moving portion C4 in a state being movable in a reciprocating manner in the X direction.

The drill 21 is held at the chuck C2 while a predetermined projecting length L1 is secured as illustrated in FIG. 2. As a result, a position of a cutting blade 21a of the drill 21 relative to the chuck C2 is constantly recognized and grasped.

A second reference point C0 serving as a reference position of the second processing portion C is provided at a specific portion in a base portion C5 of the second processing portion C, the base portion C5 receiving the X moving portion C4. Thus, the position of the cutting blade 21a of the drill 21 relative to the second reference point C0 is constantly recognized and grasped. Each of the processing head C1, the lifting portion C3 and the X moving portion C4 includes a counter such as an encoder, for example, so as to accurately recognize a rotation angle upon rotary movement or a moving distance upon translational motion of the drill 21 (the cutting blade 21a). A measurement value at each of the counters is transmitted to the control portion D.

Each of the first processing portion B and the second processing portion C may include a multi-jointed robot, for example, instead of including the construction illustrated in FIG. 1.

Driving operations of the workpiece drive portion A, the first processing portion B and the second processing portion C are controlled by the control portion D. For example, while a rotation speed of the workpiece drive portion A and a rotation speed of the first processing portion B are synchronized with each other, the processing head B1 of the first processing portion B may be controlled to perform the translational motion. In addition, the workpiece W may be rotated by a predetermined angle so that a processing position (i.e., a portion intended to be processed) at the workpiece W accurately faces the drill 21 when the drill 21 of the second processing portion C comes closer to the workpiece W.

For example, prior to the first processing, the control portion D obtains workpiece information D11 serving as information of the workpiece W, first tool information D12 serving as information of the first tool 1, and relative position information D14 serving as information for specifying a relative position between the workpiece drive portion A and the first processing portion B (i.e., a relative position between the workpiece reference point A0 and the first reference point B0). The aforementioned information is stored at a storage portion D1.

The workpiece information D11 indicates the configuration of the workpiece W before the first processing relative to the workpiece reference point A0 of the workpiece drive portion A. For example, in a case where the workpiece W is a tubular member in a cylindrical form, the workpiece information D11 indicates where each surface of the workpiece W is positioned relative to the workpiece reference point A0 in a state where the workpiece W is mounted at the workpiece drive portion A. In this case, an outer diameter of the workpiece W and a distance between an upper surface and a bottom surface of the workpiece W, for example, are stored at the storage portion D1.

The first tool information D12 specifies how the cutter 11 for skiving is mounted at the processing head B1 of the first processing portion B, for example. As illustrated in FIG. 2, the cutter 11 includes the cutting blade 11a in a gear form. A tooth groove which extends from the cutting blade 11a may form a torsion angle γ relative to a rotation axis B1X of the cutter 11. The torsion angle γ3 serves as a predetermined angle including zero. In consideration of such condition, information of a rotation phase of each tooth tip of the cutting blade 11a of the cutter 11 relative to a rotation phase of the main shaft B2 of the processing head B1 and of a length L2 defined along the rotation axis B1X from a tip end of the processing head B1 to the cutting blade 11a of the cutter 11, for example, are stored and held as the first tool information D12.

An edge portion at one end portion of the cutter 11 along the rotation axis B1X forms the cutting blade 11a as illustrated in FIGS. 1 and 2. That is, the cutter 11 for skiving has the single cutting blade 11a. Thus, the cutting blade 11a is necessarily re-polished depending on the number of workpieces W and processing time, for example. In this case, a thickness L3 of the cutter 11 is reduced depending on an amount of polishing. Specifically, in a case where the tooth groove of the cutter 11 is distorted, the position of each tooth tip is changed in a circumferential direction by a distance corresponding to the reduction of the thickness L3 of the cutter 11.

Specifically, in a case where a tooth groove 11c is formed with the torsion angle γ3, the position of the cutting blade 11a is changed and moved in the circumferential direction by a distance corresponding the reduction of the thickness L3 of the cutter 11 relative to the engagement portion 11b that is provided at the cutter 11 for positioning with the processing head B1. At this time, because the torsion angle γ3 of the cutter 11 is already known as the first tool information D12, the thickness L3 after the re-polishing is simply input to the storage portion D1 to thereby calculate the position of the cutting blade 11a in detail.

In a case where the workpiece W is processed by the first processing portion B, it is necessary to precisely obtain a relative position between the workpiece W and the cutter 11. In the present embodiment, a touch sensor, for example, which makes contact with the workpiece W is not used at the first processing. Thus, a relative positional relationship between the workpiece W and the cutter 11, for example, is specified by calculation. Specifically, first, a relative positional relationship between the workpiece reference point A0 of the workpiece drive portion A and the first reference point B0 of the first processing portion B should be accurately specified. In the workpiece drive portion A, an external configuration of the workpiece W relative to the workpiece reference point A0 is accurately obtained. In the first processing portion B, the position of each tooth tip of the cutting blade 11a of the cutter 11 relative to the first reference point B0 is accurately specified. That is, information of a length from the first reference point B0 to the cutting blade 11a of the cutter 11 in parallel to the rotation axis B1X is held as the first tool information D12. With the aforementioned length information, the position of the cutting blade 11a of the cutter 11 may be accurately calculated.

Figure 3:
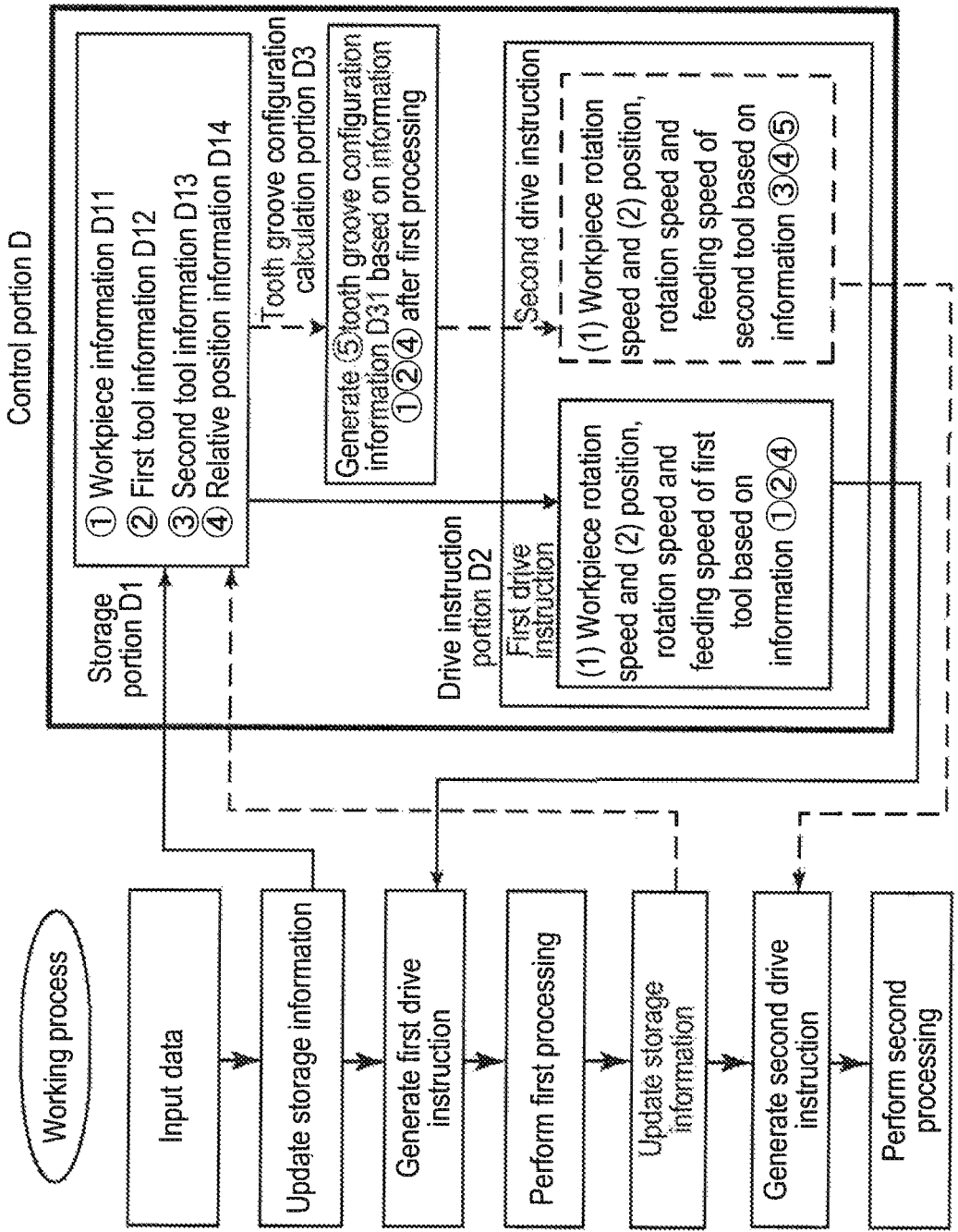
FIG. 3 is an explanatory view illustrating an operation of the combined gear cutting apparatus according to the first embodiment.

FIG. 3 illustrates an operation of the combined gear cutting apparatus S (i.e., a working process) in a case where the first processing and the second processing are performed. FIG. 3 specifically illustrates information that is considered when the combined gear cutting apparatus S is operated. As illustrated in FIG. 3, a drive instruction portion D2 of the control portion D generates a first drive instruction (i.e., a flow indicated with a solid line in FIG. 3) for the first processing based on the workpiece information D11, the first tool information D12 and the relative position information D14 which are obtained in the aforementioned manner. The first drive instruction includes the rotation speed of the workpiece W, a position, a direction, a rotation speed and a feeding speed of the first tool 1, for example. The first drive instruction is sent to the workpiece drive portion A and the first processing portion B to thereby perform the first processing.

In the gear cutting serving as the first processing, an idle operation is performed as illustrated in FIG. 2. Before the cutting blade 11a of the cutter 11 makes contact with the workpiece W, the workpiece W and the cutter 11 are synchronously rotated with each other while the cutter 11 moves by an idle running distance L4. Accordingly, impact upon contact of the workpiece W and the cutter 11 is weakened and a chip or a crack of the cutting blade 11a of the cutter 11, for example, is inhibited.

For the idle operation, information of the idle running distance L4 may be desirably added or included beforehand to the relative position information D14 or the workpiece information D11, for example. A processing length LW of the workpiece W is thus recognized as being elongated by the idle running distance L4. As a result, the tooth groove may be formed at a predetermined position in the workpiece W at a moment when the cutter 11 actually makes contact with the workpiece W.

In case of performing the first processing including the aforementioned idle operation, the workpiece drive portion A and the first processing portion B are synchronously rotated with each other and the first processing portion B is fed at a predetermined speed relative to the rotation axis AX of the workpiece W while the workpiece information D11, the first tool information D12 and the relative position information D14 are being considered. In the first processing, the configuration of the workpiece W and the position and the direction of the first tool 1 are changed and further a relative position between the workpiece W and the first tool 1 is changed. Thus, the workpiece information D11, the first tool information D12 and the relative position information D14 are successively updated. As illustrated in FIG. 3, based on the workpiece information D11, the first tool information D12 and the relative position information D14 which are updated, tooth groove configuration information D31 for specifying a tooth groove configuration of the workpiece W after the completion of the first processing is generated.

Next, the second processing such as a boring process, for example, performed on the workpiece W after the first processing is completed is explained.

Second tool information D13 serves as information for specifying the position of the cutting blade 21a of the second tool 2 relative to the second reference point C0 of the second processing portion C. Various tools may be employed for the second tool 2. In the present embodiment, an example where the drill 21 is used as the second tool 2 is explained.

The second tool information D13 regarding the drill 21 mainly includes an outer diameter and the projecting length L1 from a tip end of the chuck C2 of the second processing portion C to a tip end of the drill 21. The rotation of the workpiece W is basically not necessary for the processing by the drill 21. A calculation result including a position in the surface of the workpiece W to which the drill 21 approaches and a position and a direction of the drill 21 at that time is necessary. The processing head C1 of the present embodiment simply projects and retracts in the horizontal direction relative to the workpiece W. In a case where at least the projecting length L1 of the drill 21 is obtained and grasped, the tip end of the drill 21 may be brought to face and direct a predetermined position of the workpiece W.

In a case where the drill 21 is moved at the second processing, such moving information is successively stored at the storage portion D1. The relative position information D14 serving as information of a relative position between the drill 21 (the second processing portion C) and the workpiece drive portion A is successively updated.

As illustrated in FIG. 1, the drill 21 is moved (i.e., the position of the drill 21 is changed) while keeping its horizontal position. The workpiece drive portion A rotates the workpiece W by a predetermined angle at the second processing. For example, in a case where the tooth groove is formed at the workpiece W at the first processing, the boring at the second processing may be sometimes desired at a position in a tooth bottom of the tooth groove of the workpiece W by a predetermined distance from either end portion of the workpiece W. Thus, in addition to moving the tip end portion of the drill 21 to the aforementioned position, the workpiece W is rotated so that the processing position at the workpiece W is adjusted to the tooth bottom.

In a known processing, the configuration of the tooth groove of the workpiece W may be recognized and grasped by touch sensing during the processing with the drill 21. In the present embodiment, the configuration of the tooth groove of the workpiece W is recognized and grasped by calculation. Specifically, a tooth groove configuration calculation portion D3 provided at the control portion D calculates the configuration of the tooth groove (tooth groove configuration) formed at the workpiece W based on the workpiece information D11, the first tool information D12 and the relative position information D14 after the completion of the first processing so as to generate the tooth groove configuration information D31 (i.e., a flow indicated with a dotted line in FIG. 3). The time of completion of the first processing corresponds to a moment when the intended processing on the workpiece W by the first tool 1 is completed and the feeding of the first tool 1 along the rotation axis AX of the workpiece W is stopped.

In a state where the first processing is completed, the position of the cutting blade 11a of the cutter 11 is recognized and grasped as the first tool information D12. The tooth groove configuration of the workpiece W is calculated under conditions where the tooth groove intended to be processed has been formed at a position in the workpiece W corresponding to the aforementioned position of the cutting blade 11a.

In a case where the workpiece W is rotated for the second processing after the first processing, the tooth groove configuration may be calculated only on a basis of the cutting blade 11a which exists in the vicinity of a region serving as a target position of the second processing in view of the rotation angle of the workpiece W. A calculation load may be therefore reduced.

The tooth groove configuration information D31 obtained in the aforementioned manner is sent to the drive instruction portion D2 provided at the control portion D. At the drive instruction portion D2, the rotation angle of the workpiece W, a moving position, a rotation speed and a feeding speed of the drill 21 serving as the second tool 2 are determined on a basis of the tooth groove configuration information D31, the second tool information D13 and the relative position information D14 between the workpiece drive portion A and the second processing portion C (i.e., the relative position between the workpiece reference point A0 and the second reference point C0). A second drive instruction is generated on a basis of the aforementioned conditions (i.e., the rotation angle of the workpiece W, the moving position, the rotation speed and the feeding speed of the drill 21) to perform the second processing.

At the second processing, the workpiece drive portion A is rotated to a predetermined position so that a position adjustment range of the second processing portion C which holds the drill 21 may decrease. For example, in order to decide the position of the drill 21 relative to the workpiece W, the rotation of the workpiece drive portion A is utilized to thereby reduce the number of drive shafts (drive axes) provided at the second processing portion C. According to the combined gear cutting apparatus S including the aforementioned construction, the processing in a state where either the workpiece W or the second tool 2 is stationary may be easily performed with the simple construction.

At the time the processing by the second tool 2 is actually performed, a relative position between the workpiece W and the second tool 2 is already specified. Thus, sensing of the position of the tooth groove of the workpiece W, for example, prior to the second processing is not necessary, which greatly reduces an idle time from the first processing to the second processing.

Further, a sensing apparatus which is brought to make contact with the workpiece W, for example, is basically not necessary, which leads to a simplified construction of the combined gear cutting apparatus S. Even in a case where a highly accurate sensing apparatus which is brought to make contact with the workpiece W is necessary, the sensing operation may be simplified and promptly performed because the tooth groove configuration is recognized and grasped beforehand.

The workpiece W illustrated in FIGS. 1 and 2 includes two gear wheels (i.e., first and second gear wheels) as an example. In processing the second gear wheel, in a case where a different cutter from the cutter 11 for skiving which processes the first gear wheel is utilized, the second gear cutting (i.e., the gear cutting of the second gear wheel) may be treated as the aforementioned second processing. Specifically, in a case where a specific phase relation is required between tooth grooves of the two gear wheels, it is necessary to accurately recognize and grasp the tooth groove configuration of the first gear wheel by the first gear cutting. In a case of no specific correlation between the two gear wheels, the gear cutting may be performed so that the aforementioned first processing is repeated, i.e., is performed two times.

In a second embodiment, a second cutter 22 for tooth chamfering is employed as the second tool 2. For example, as illustrated in FIG. 4, the second cutter 22 includes at least one bit 22b for chamfering at a tip end of a shaft portion 22a of the second cutter 22.

The bit 22b includes a cutting blade 22c which is inclined at a predetermined angle conforming to a chamfering process of the workpiece W and is rotated at a predetermined rotation speed. The main shaft A1 of the workpiece drive portion A is also rotated at a predetermined angle so that the second cutter 22 approaches the workpiece W to cut therein by a predetermined amount. In FIG. 4, in order to easily recognize and grasp a configuration of the second cutter 22, the second cutter 22 is illustrated being slightly enlarged. An outer diameter of a rotation locus formed by the cutting blade 22c of the second cutter 22 is specified smaller than a width of the tooth groove formed at the workpiece W. That is, the second cutter 22 is positioned between the tooth grooves of the workpiece W while the shaft portion 22a is being rotated. The second cutter 22 moves relative to the workpiece W along an outline of a tooth profile thereof. In this case, a rotation speed of the main shaft A1 and a moving speed of the second cutter 22 are desirably synchronized with each other, specifically at processing start, so as to adjust a speed at which the second cutter 22 is collided with the tooth groove of the workpiece W.

The rotation of the main shaft A1 is desirably started while the second cutter 22 is moving to a start position of the second processing, so that the cutting blade 22c of the second cutter 22 gradually makes contact with a target chamfering portion in the workpiece W. The cutting blade 22c of the second cutter 22 is inhibited from rapidly and sharply cutting a tooth tip formed at the workpiece W to thereby securely perform the chamfering process.

Accordingly, at the time of tooth chamfering, the tooth groove configuration information D31 is also specified on a basis of the workpiece information D11, the first tool information D12 and the relative position information D14 obtained after the completion of the first processing, and a relative positional relationship between the workpiece W and the second cutter 22 is accurately controlled with a usage of the second tool information D13 and the relative position information D14.

In a case where the second processing is the tooth chamfering and the second tool 2 is a non-rotary cutting tool such as a tool bit, for example, a position of a cutting blade of the second tool 2 is brought to match an edge portion of the tooth profile of the workpiece W. In addition, the position of the second tool 2 is changed so that an angle of the cutting blade conforms to the tooth profile of the workpiece W. In this case, the tooth groove configuration information D31, the second tool information D13 and the relative position information D14 are also utilized.

In a case where the second processing is the tooth chamfering and the second tool 2 includes a gear wheel form, the tooth groove configuration information D31, the second tool information D13 and the relative position information D14 after the completion of the first processing are also utilized. In this case, not only a phase of the tooth profile formed at the workpiece W but also a phase of a tooth profile of the second tool 2 are recognized and grasped so as to obtain complete synchronized rotations of the workpiece W and the second tool 2. According to the combined gear cutting apparatus S of the second embodiment, processing which requires a synchronized movement of the workpiece W and the second tool 2 may be easily performed.

In a case where the workpiece W is mounted at the workpiece drive portion A, the engagement portion Wb including the protruding portion and the recess portion, for example, which engage with each other are provided over the workpiece W and the workpiece drive portion A so that the rotation phase of the workpiece W relative to the workpiece drive portion A is inhibited from changing. Nevertheless, in a case where a looseness exists at the engagement portion Wb, for example, accuracy in calculation of the position (direction) of the workpiece W may decrease. Therefore, in a third embodiment, in addition to a method for determining the position (direction) of the workpiece W after the first processing by the calculation, a method for measuring the position (direction) of the workpiece W by a different position measurement apparatus such as a touch sensor, for example, is explained. Detailed examples are illustrated in FIGS. 5A to 5F.

FIG. 5A illustrates a state where the position (direction) of the workpiece W is roughly adjusted prior to touch sensing by a probe P. Because the position of the probe P is determined or fixed, the workpiece W is rotated to a position where the probe P is expected to proceed into the deepest point in the tooth groove based on the workpiece information D11 which is updated upon completion of the first processing.

Once the position (direction) of the workpiece W is determined, the probe P is inserted to the tooth groove by a predetermined depth. Next, the workpiece W is rotated in a clockwise direction in FIG. 5B, for example, so as to make contact with the probe P. An angle α relative to a horizontal line, for example, at a predetermined position of the workpiece W where the workpiece W (specifically, one tooth thereof) makes contact with the probe P is stored at the storage portion D1.

The workpiece W is then rotated in a counterclockwise direction as illustrated in FIG. 5C so that a neighboring tooth of the aforementioned one tooth makes contact with the probe P. An angle β relative to the horizontal line, for example, at a predetermined position of the workpiece W where the workpiece W (specifically, the aforementioned neighboring tooth) makes contact with the probe P is stored at the storage portion D1.

The workpiece W is rotated to an intermediate position between the aforementioned angle α and the angle β as illustrated in FIG. 5D.

The second processing is performed on the workpiece W so that the drill 21 approaches the workpiece W, for example, as illustrated in FIG. 5E.

In a case where the boring process for a second bore (i.e., second boring process) is required, the workpiece W is rotated by a predetermined angle in consideration of the number of teeth formed at the workpiece W to perform the second boring process with the drill 21 as illustrated in FIG. 5F.

Accordingly, the touch sensor including the probe P, for example, is utilized prior to the second processing so that the position (direction) of the workpiece W may be accurately identified to thereby improve processing accuracy of the second processing.

In addition, because the workpiece W is rotated on a basis of the workpiece information D11 after the completion of the first processing prior to the touch sensing, the probe P may be inserted to a deeper position in the tooth groove at once when the probe P is brought to come closer to the workpiece W. A time period for sensing is therefore reduced to improve efficiency of gear cutting.

The first processing portion B for driving the first tool 1 and the second processing portion C for driving the second tool 2 may serve as a common processing portion. For example, the single processing portion is achieved by using an automatic tool exchange apparatus which automatically changes the first tool 1 and the second tool 2, for example, to thereby reduce the size of the apparatus.

According to the aforementioned embodiments, the combined gear cutting apparatus S includes the workpiece drive portion A configured to hold and rotate the workpiece W which serves as a processing object, the first processing portion B holding the first tool 1 which serves as a gear cutting tool and moving the first tool 1 to a processing position for the workpiece W in a state where the first tool 1 rotates synchronously with the workpiece drive portion A, the second processing portion C holding the second tool 2 which serves as a cutting tool different from the gear cutting tool and moving the second tool 2 to a processing position for the workpiece W in a state where the second tool 2 is synchronized with the workpiece drive portion A, and the control portion D controlling driving operations of the workpiece drive portion A, the first processing portion B and the second processing portion C. The control portion D includes the storage portion D1 which stores the workpiece information D11 indicating the configuration of the workpiece W relative to the workpiece reference point A0 of the workpiece drive portion A before the first processing is performed, the first tool information D12 specifying the position of the cutting blade 11a of the first tool 1 relative to the first reference point B0 of the first processing portion B, the second tool information D13 specifying the position of the cutting blade 21a of the second tool 2 relative to the second reference point C0 of the second processing portion C, and the relative position information D14 specifying the relative position between the workpiece reference point A0, the first reference point B0 and the second reference point C0. The control portion D includes the tooth groove configuration calculation portion D3 calculating the tooth groove configuration information D31 of the workpiece W relative to the workpiece reference point A0 based on the first tool information D12, the workpiece information D11 and the relative position information D14 obtained when the first processing by the first tool 1 is completed. The second tool 2 is configured to move to the start position of the second processing for the workpiece W based on the tooth groove configuration information D31, the second tool information D13 and the relative position information D14.

Accordingly, the tooth groove configuration of the workpiece W may be specified and identified on a basis of the workpiece information D11, the first tool information D12 and the relative position information D14 obtained when the first processing is completed. That is, in a case where the second processing is performed by the second tool 2 following the first processing, the position of the tooth groove of the workpiece W is not necessarily sensed by a specific apparatus. An idle time from the first processing to the second processing is greatly reduced, which leads to efficient gear cutting and following processing.

In addition, because a sensing apparatus such as a touch sensor, for example, is not necessary, the construction of the combined gear cutting apparatus S is simplified. Even in a case where a highly accurate touch sensor is employed so as to specify the position of the workpiece W highly accurately, the configuration of the workpiece W is specified by the calculation so that a sensing operation may be simplified and promptly performed.

Further, because the sensing apparatus is not necessary, a working space for the processing is reduced, which may achieve the combined gear cutting apparatus S of which entire construction is reduced.

According to the aforementioned embodiments, the first tool 1 is the cutter 11 for skiving which includes a predetermined torsion angle including zero, the position of the cutting blade 11a of the cutter 11 being automatically calculated on a basis of the torsion angle γ3 and a change amount of the thickness L3 of the cutter 11 in the first tool information D12.

In the cutter 11 for skiving, the tooth groove is formed at an outer surface portion. An edge portion at one end portion of the cutter 11 in a thickness direction thereof only forms the cutting blade 11a. Thus, the cutting blade 11a is re-polished (i.e., renewal polishing is performed on the cutting blade 11a) after the gear cutting is performed predetermined number of times. At this time, depending on types of the cutter, the cutter 11 includes a predetermined torsion angle along the thickness direction thereof. In this case, decrease of thickness of the cutter 11 by re-polishing causes a tip end position of each tooth forming the cutting blade 11a to be displaced in a direction along the rotation axis B1X of the cutter 11. When the position of the cutting blade 11a is not changed in the aforementioned manner, an outline of the cutting blade 11a is slightly displaced along a rotation direction because of the torsion angle of the cutting blade 11a.

Therefore, the position of the cutting blade 11a of the cutter 11 relative to the first reference point A0 is stored as the first tool information D12. Thus, sensing of the position of the tooth groove of the workpiece W is not necessary at the second processing following the first processing (skiving). In addition to a speed of the first processing (skiving), the idle time when plural continuous processing is performed on the workpiece W is reduced so that working efficiency improves as a whole.

According to the first embodiment, the second tool 2 is the drill 21, the workpiece drive portion A rotating the workpiece W to a position at which the workpiece W is processed by the drill 21 in a case where the drill 21 is moved to the start position of the second processing, the workpiece drive portion A being configured not to operate at the second processing.

As long as the workpiece drive portion A is rotatable to the aforementioned position (predetermined position) at the second processing, a position adjustment range of the second processing portion B which holds the drill 21 may decrease. For example, in order to decide the position of the drill 21 relative to the workpiece W, the rotation of the workpiece drive portion A is utilized to thereby reduce the number of drive shafts (drive axes) provided at the second processing portion B. According to the combined gear cutting apparatus S with the aforementioned construction, the processing in a state where either the workpiece W or the second tool 2 is stationary may be easily performed with the simple construction.

According to the second embodiment, the second tool 2 is the second cutter 22 for tooth chamfering, the workpiece drive portion A starting a rotation of the workpiece W while the second cutter 22 is moving to the start position of the second processing, the second cutter 22 being configured to be synchronously driven with the workpiece W.

The tooth chamfering serves as chamfering along an intersection edge between an end portion of the tooth groove along a rotation axis of a gear wheel of the workpiece W and an end surface of the gear wheel. Thus, a phase of the tooth groove at the end surface of the workpiece W is necessarily completely recognized as the configuration of the intersection edge.

Specifically, it is essential also for the tooth chamfering to recognize and grasp the tooth groove configuration information D31 after the first processing. The tooth groove configuration information D31 of the workpiece W is specified on a basis of the workpiece information D11, the first tool information D12 and the relative position information D14 obtained upon completion of the first processing. Further, it is necessary to accurately control a feeding position of the second cutter 22 relative to the workpiece W or a rotation speed of the second cutter 22, for example, based on the second tool information D13 and the relative position information D14.

The second cutter 22 for tooth chamfering and the workpiece W are synchronously driven with each other so that the cutting blade 22c of the second cutter 22 may be accurately positioned relative to a portion in the workpiece W where the chamfering is required. The second cutter 22 is synchronously driven with the workpiece W so that impact upon contact of the second cutter 22 with the portion where the chamfering is required may be reduced. The tooth groove formed at the workpiece W by the first processing is not excessively deformed, which may obtain the product (i.e., the combined gear cutting apparatus 5) with improved processing accuracy. Because the impact upon contact between the second cutter 22 with the portion where the chamfering is required is reduced, damage of the second cutter 22 may be inhibited.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A combined gear cutting apparatus comprising:
a workpiece drive portion configured to hold and rotate a workpiece which serves as a processing object;
a first processing portion holding a first tool which serves as a gear cutting tool and moving the first tool to a processing position for processing the workpiece in a state where the first tool rotates synchronously with the workpiece drive portion;
a second processing portion holding a second tool which serves as a cutting tool different from the gear cutting tool and moving the second tool to a processing position for processing the workpiece in a state where the second tool is synchronized with the workpiece drive portion; and
a control portion controlling driving operations of the workpiece drive portion, the first processing portion and the second processing portion,
the control portion including a storage portion which stores: (i) workpiece information indicating a configuration of the workpiece relative to a workpiece reference point of the workpiece drive portion, which configuration is the configuration before first processing is performed by the first tool, (ii) first tool information specifying a position of a cutting blade of the first tool relative to a first reference point of the first processing portion, (iii) second tool information specifying a position of a cutting blade of the second tool relative to a second reference point of the second processing portion, and (iv) relative position information specifying a relative position between the workpiece reference point, the first reference point and the second reference point,
the control portion including a tooth groove configuration calculation portion calculating tooth groove configuration information of the workpiece relative to the workpiece reference point based on the first tool information, based on the workpiece information, and based on the relative position information obtained when the first processing by the first tool is completed,
the second tool being configured to move to a start position of second processing for the workpiece based on the tooth groove configuration information, based on the second tool information and based on the relative position information.

2. The combined gear cutting apparatus according to claim 1, wherein the first tool is a cutter for skiving, which cutter includes a tooth groove that forms a predetermined torsion angle relative to a rotation axis of the cutter, the position of the cutting blade of the cutter being automatically calculated on a basis of the torsion angle and on the basis of a change amount of a thickness of the cutter in the first tool information.

3. The combined gear cutting apparatus according to claim 1, wherein the second tool is a drill, wherein the drill is moved to the start position of the second processing, and wherein the workpiece drive portion rotates the workpiece to a position at which the workpiece is processed by the drill, the workpiece drive portion being configured not to operate during the second processing.

4. The combined gear cutting apparatus according to claim 1, wherein the second tool is a second cutter for tooth chamfering, the workpiece drive portion starting a rotation of the workpiece while the second cutter is moving to the start position of the second processing, the second cutter being configured to be synchronously driven with the workpiece.

* * * * *